ns Cited
U.S. PATENT DOCUMENTS

| | | | |
|---|---|---|---|
| 2,367,384 | 1/1945 | Tymstra et al. | 210/DIG. 21 |
| 3,235,482 | 2/1966 | Knowles et al. | 208/45 |
| 3,567,660 | 3/1971 | Winkler | 210/40 |
| 3,732,162 | 5/1973 | McCoy et al. | 210/40 |
| 3,786,134 | 1/1974 | Amagi et al. | 423/445 |
| 3,855,152 | 12/1974 | Preus | 210/40 |
| 3,859,421 | 1/1975 | Hucke | 423/445 |
| 3,891,574 | 6/1975 | Kobayashi et al. | 210/40 |

United States Patent [19]
Wilcox

[11] 4,160,729
[45] Jul. 10, 1979

[54] METHOD FOR SEPARATING OILS FROM WATER

[75] Inventor: Ralph S. Wilcox, Napa, Calif.

[73] Assignee: Chevron Research Company, San Francisco, Calif.

[21] Appl. No.: 508,114

[22] Filed: Sep. 23, 1974

[51] Int. Cl.² .............................................. C02B 9/02
[52] U.S. Cl. .............................. 210/40; 210/DIG. 26
[58] Field of Search ........ 210/40, DIG. 21, DIG. 26; 208/45; 252/444; 423/445, 449

[56] References Cited

Primary Examiner—Charles N. Hart
Assistant Examiner—Ivars Cintins
Attorney, Agent, or Firm—D. A. Newell; R. H. Davies; D. L. Hagmann

[57] ABSTRACT

Oil contaminants present in water are removed by contacting the water with deoiled petroleum asphalt bottoms.

7 Claims, No Drawings

METHOD FOR SEPARATING OILS FROM WATER

BACKGROUND OF THE INVENTION

Field of the Invention

This invention relates to a method for separating oily contaminants from water. More particularly, these contaminants are removed by contacting the water with deoiled petroleum asphalt bottoms.

It is well known that waste-water streams from industrial and agricultural processes contain or are polluted by oily contaminants. For example, machine oils, greases, fuel oils, and raw oily stocks used for chemical starting materials seem to inexorably get into process water streams despite costly, strenuous and sincere efforts by the processor to avoid such contamination. Since the volume of water normally used in the processing art is immense, there is an urgent need for a simple and inexpensive, yet effective, means to reduce oil contamination of water, the object of the present invention. Treated hydrophilic materials have been proposed as useful and suitable adsorbents, for example cellulosic materials, but these materials are disadvantageous for a number of reasons, including cost and a relatively low capacity for oils.

SUMMARY OF THE INVENTION

In an embodiment, the present invention concerns a method for improving oil-contaminated water which comprises: (1) contacting the water with a porous asphalt, said porous asphalt having been prepared by steps including (a) substantially saturating said asphalt, at a temperature above its softening temperature, with an extractable oil, (b) cooling the resulting mixture to a temperature at least 20° C. below its initial ring-and-ball softening temperature, and (c) removing the extractable oil by solvent extracting said mixture at a temperature below said initial softening temperature; and (2) separating the resulting oil-containing bottoms from the water.

By "asphaltic bottoms," as used herein, is meant the pitch-like residue normally obtained in the processing of heavy petroleum crude oils, e.g., petroleum asphalt bottoms. These materials are complex mixtures of one or more materials known as asphaltenes, porphyrins and petroleum resins. Surprisingly, these materials in their deoiled form, for example as represented by solvent deasphalt bottoms (SDA) ordinarily produced in the petroleum refining art (see, for example, U.S. Pat. No. 3,288,703, Byron G. Spars et al), are porous and capable of acting as a sponge for oleaginous materials. Based upon the volume of the solid SDA, Applicant has discovered that as much as 5 volume percent of oil is readily absorbed by the SDA with little or no swelling of the solid.

The contacting of the oil-polluted water may be by any suitable means, including passing the water through a bed of particulate (pulverized, shaped, prilled, comminuted, spherized, and the like) deoiled asphaltic bottoms, drawing flow-through containers filled with de-oiled asphaltic bottoms through or upon the surface of the water, maintaining a corralled layer of porous particulate solid on the surface of a flowing water body, and the like. Preferably the contacting is by passing the water through a bed of the solid sized for a high surface-to-weight aspect of the solid, yet large enough to permit a convenient rate of flow of water through the bed and for the retention of the solid in the bed, for example particles sized in the average diameter range from about $\frac{1}{8}$" to $\frac{1}{2}$". From time to time it may be convenient and desirable in the contacting that the deoiled asphaltic bottoms be in the form of sheets, rods, and the like, as known in the heterogeneous liquid-solid phase contacting art.

As discussed above, ordinary deoiled asphaltic bottoms have an excellent and useful pore volume. In a further aspect of the present invention, this pore volume may be substantially enhanced by any suitable means, particularly those employed in the resin and plastic art, that is by heating the bottoms material to a temperature in the thermo-plastic range and increasing the pore volume by means of chemically and/or thermally activating blowing agents compatible with oleaginous materials. Other pore-volume-enhancing means suitable herein include the substantial saturation of the asphaltic bottoms material at a temperature above the softening temperature of the bottoms material with an extractable oil, for example a lower polycyclic aromatic hydrocarbon, cooling the resulting mixture to a temperature at least about 20° C. below the initial ring-and-ball softening temperature (ASTM D-36), and then removing the extractable oil by solvent-extracting the mixture at a temperature below the softening point. Pore-volume-enhanced asphaltic bottoms exhibit substantially improved flotation characteristics on water and, of course, an improved capacity for oil.

At times and for improved results, the crude SDA bottoms are desirably solvent-extracted with water, preferably hot water, and then treated to enhance the pore volume, for example by a succeeding solvent extraction with a hydrocarbon solvent, treated with a chemical blowing agent, and the like.

The temperature desirably used in the contacting of the water with the deoiled asphaltic bottoms may vary widely. Depending upon a number of factors, including the mode of the contacting, the temperature should be below the softening temperature for the solid. Where the contacting is by means of a bed of particulate solid, the temperature should be below the initial ring-and-ball softening temperature in order to avoid the plastic flow of the solid and consequent plugging of the bed.

The method of this invention can be applied to a mixture of water and oils in any mixing ratio. The mixture may contain other substances such as inorganic salts, particulate solids, etc. The oil may be present in the form of an oil-in-water emulsion and/or as a separate phase or any combination of the foregoing. The absorbed oil may, if desirable, be separated and recovered from the resulting oil-impregnated asphaltic bottoms by any suitable means, including solvent extraction, heating and vaporization, and the like ordinary hydrocarbon separation methods. Alternatively, the oil-impregnated solid may be conveniently disposed of by its use as a fuel.

EXAMPLES

This invention will be explained in more detail by the following examples. They are given merely by way of explanation and are not intended to limit the scope of this invention. It should be understood that many modifications or improvements may be made in this invention and yet not depart from the spirit and scope thereof.

EXAMPLE 1

A portion of solvent-deasphalted bottoms was tested for its capacity to adsorb ordinary refinery cutter oil. It was found that, based upon the volume of the bottoms material, as much as 5 volume percent of the oil was readily adsorbed with no appreciable increase in volume of the adsorbent bottoms material.

EXAMPLE 2

A bed of pulverized SDA bottoms was prepared and a sample of oily refinery effluent process water was percolated through the bed. Both the oxidation demand (reflexion of the oil content) and the ammonia concentration of the water appeared to be significantly reduced.

EXAMPLE 3

In this example, 10 parts by weight of pulverized SDA bottoms were added to 60 parts of water containing 10 parts of mineral oil. The resulting heterogeneous-phase mixture was vigorously mixed and permitted to settle. Most of the oil was adsorbed into the SDA bottoms, which had balled up into a hard, agglomerated, easily separable mass.

EXAMPLE 4

Example 3 was repeated, except that sea water was used in place of fresh water. Again, the SDA bottoms adsorbed the oil and an easily separable oil-containing solid was produced.

The above examples illustrate that deoiled asphaltic bottoms materials obtained from deoiling heavy refinery crude oil residues are useful for treating oil- and/or ammonia-polluted water streams.

What is claimed is:

1. A method for improving oil-contaminated water which comprises:
   (1) contacting the water with porous petrolem asphalt bottom, said porous asphalt having been prepared by steps including (a) substantially saturating said asphalt, at a temperature above its softening temperature, with an extractable oil, (b) cooling the resulting mixture to a temperature at least 20° C. below its initial ring-and-ball softening temperature, and (c) removing the extractable oil by solvent extracting said mixture at a temperature below said initial softening temperature; and
   (2) separating the resulting oil-containing bottoms from the water.

2. A method as in claim 1 wherein the bottoms are sized to have an average diameter in the range from about one-eighth to one-half inch.

3. A method as in claim 1 wherein the contacting is with pulverized bottoms.

4. A method as in claim 1 wherein the bottoms are prepared by a method which includes a water extraction of crude bottoms material.

5. A method as in claim 1 further characterized in that said bottoms consists essentially of asphalt.

6. A method for removing oily contaminants from water, which comprises: contacting said water with particulate porous petroleum asphalt bottoms, particles of said bottoms being sized to have an average diameter in the range from about one-eighth to one-half inch, and said bottoms having been prepared by steps including:
   (1) substantially saturating said asphalt bottoms at a temperature above the softening temperature thereof with an extractable oil;
   (2) cooling the resulting mixture to a temperature at least 20° C. below its initial ring-and-ball softening temperature; and
   (3) removing the extractable oil by solvent extracting said mixture at a temperature below said initial softening temperature.

7. A method as in claim 6 wherein said contacting is effected with said particles in a bed.